United States Patent [19]

Yuta

[11] 4,201,440
[45] May 6, 1980

[54] LENS SYSTEM FOR MICRO FILM

[75] Inventor: Koichi Yuta, Mitaka, Japan

[73] Assignee: Olympus Optical Co., Ltd., Tokyo, Japan

[21] Appl. No.: 932,218

[22] Filed: Aug. 9, 1978

[30] Foreign Application Priority Data

Aug. 17, 1977 [JP] Japan .................................. 52/98437

[51] Int. Cl.² .......................... G02B 9/64; G02B 13/14
[52] U.S. Cl. ........................................ 350/1.2; 350/214
[58] Field of Search ........................... 350/1.2, 214, 177

[56] References Cited

U.S. PATENT DOCUMENTS 4,050,778  9/1977  Fleischman ........................ 350/214 X
4,050,779  9/1977  Fleischman ........................... 350/1.2

Primary Examiner—Paul A. Sacher
Attorney, Agent, or Firm—Cushman, Darby & Cushman

[57] ABSTRACT

A lens system for micro film which provides high resolution over a wide range with an ultraviolet ray, and has transmittance sufficient for said ray and a long working distance on the image side. Said lens system comprises a first negative cemented doublet component, a second positive lens component, a third positive lens component, a fourth positive lens component, a fifth positive lens component, a sixth negative cemented doublet component, a seventh negative meniscus lens component, an eighth cemented meniscus lens component and a ninth positive meniscus lens component.

3 Claims, 6 Drawing Figures

LENS SYSTEM FOR MICRO FILM

BACKGROUND OF THE INVENTION (a) Field of the Invention

The present invention relates to a high resolution lens system for micro film.

(b) Description of the Prior Art

Though light sources emitting visible rays have conventionally been used for photographing on micro films, it is now demanded to photograph reduced images with higher resolution. Examinations made to meet such a demend have indicated that it is possible to photograph reduced images with higher resolution by using a light source emitting rays of higher energy and a sensitive material assuring higher resolution. Speaking concretely, rays emitted from a mercury lamp contains a line of 3650 Å which has very high energy. By using this line in combination with such a sensitive material as mentioned above, resolution can be enhanced up to $1\mu$.

However, the above-mentioned line has a short wavelength, thereby restricting use of glass material having high refractive index which reduces transmittance. It is therefore very difficult to design a lens system having high resolution.

SUMMARY OF THE INVENTION

A general object of the present invention is to provide a lens system for micro film which has high resolution over a wide range with ultraviolet ray of approximately 3650 Å, transmittance sufficient for said ray and a long working distance on the image side.

The lens system for micro film according to the present invention comprises a first negative cemented doublet component, a second positive lens component, a third positive lens component, a fourth positive lens component, a fifth positive lens component, a sixth negative cemented doublet component, a seventh negative meniscus lens component, an eighth cemented meniscus doublet component and a ninth positive meniscus lens component. Said lens system is so designed as to satisfy the following conditions:

(1) $-14f < r_7 < -11f$
(2) $0.31f < r_{14} < 0.35f$
(3) $-1.2f < r_{15} < -0.8f$
(4) $-2.1f < r_{16} < -2.0f$ wherein the reference symbols represent as defined below:

$r_7, r_{14}, r_{15}$ and $r_{16}$: radii of curvature on the image side surface of the third lens component, the image side surface of the sixth lens component and the surfaces on both the sides of the seventh lens component f: focal length of the entire lens system as a whole Now, significance of the above-mentioned conditions will be described consecutively. The condition (1) is defined for correcting coma effectively. If radius of curvature $r_7$ is smaller than the lower limit of this condition, coma will be undercorrected. If $r_7$ is larger than the upper limit of the conditions (1), astigmatism will be overcorrected.

The condition (2) is required for correcting curvature of field effectively. If $r_{14}$ is smaller than the lower limit of the condition (2), curvature of field will be overcorrected. If $r_{14}$ exceeds the upper limit of the condition (2), in contrast, curvature of field will be undercorrected. The condition (3) is necessary for correcting spherical aberration and astigmatism effectively. If $r_{15}$ is smaller than the lower limit of the condition (3), spherical aberration will be undercorrected. If $r_{15}$ exceeds the upper limit of the condition (3), distortion will be aggravated and, in addition, astigmatism will be overcorrected.

The condition (4) is effective for favorably correcting distortion. Distortion will be undercorrected if $r_{16}$ is smaller than the lower limit of the condition (4), whereas astigmatism will be aggravated if $r_{16}$ is larger than the upper limit of the condition (4).

In addition, the cemented surface of the eighth lens component should preferably be concave on the image side, and the second through fifth positive lens components are so composed as to refract rays gradually.

DETAILED DESCRIPTION OF THE PREFERRED EMBODIMENTS

Figure 1:
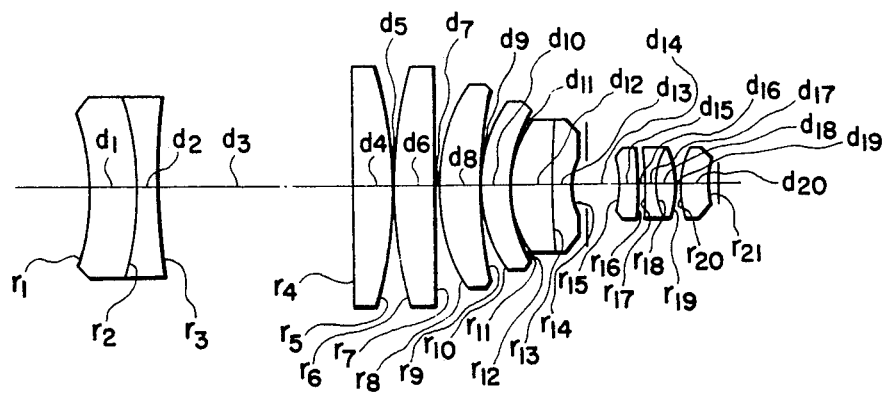
FIG. 1 shows a sectional view illustrating the composition of the Embodiment 1.

Now, some preferred embodiments of the present invention will be described with reference to the accompanying drawings.

| Embodiment 1 $f = 1.0$ | | $\beta = 1/10$ | N.A $= 0.30$ |
|---|---|---|---|
| $r_1 = -1.6918$ | | | |
| | $d_1 = 0.3359$ | $n_1 = 1.50405$ | $\nu_1 = 70.15$ |
| $r_2 = -2.5058$ | | | |
| | $d_2 = 0.1679$ | $n_2 = 1.67357$ | $\nu_2 = 35.70$ |
| $r_3 = 7.4793$ | | | |
| | $d_3 = 1.3684$ | | |
| $r_4 = 34.4297$ | | | |
| | $d_4 = 0.2749$ | $n_3 = 1.64083$ | $\nu_3 = 56.36$ |
| $r_5 = -2.9883$ | | | |
| | $d_5 = 0.0084$ | | |
| $r_6 = 2.5689$ | | | |
| | $d_6 = 0.3594$ | $n_4 = 1.64083$ | $\nu_4 = 56.36$ |
| $r_7 = -13.5736$ | | | |
| | $d_7 = 0.0041$ | | |
| $r_8 = 1.2594$ | | | |
| | $d_8 = 0.2603$ | $n_5 = 1.64083$ | $\nu_5 = 56.36$ |
| $r_9 = 2.4748$ | | | |
| | $d_9 = 0.0041$ | | |
| $r_{10} = 0.9243$ | | | |
| | $d_{10} = 0.2314$ | $n_6 = 1.64083$ | $\nu_6 = 56.36$ |
| $r_{11} = 1.1089$ | | | |
| | $d_{11} = 0.0041$ | | |
| $r_{12} = 0.7576$ | | | |
| | $d_{12} = 0.2939$ | $n_7 = 1.58016$ | $\nu_7 = 58.62$ |
| $r_{13} = 4.9475$ | | | |
| | $d_{13} = 0.1259$ | $n_8 = 1.67357$ | $\nu_8 = 35.70$ |
| $r_{14} = 0.3169$ | | | |
| | $d_{14} = 0.3421$ | | |
| $r_{15} = -0.8299$ | | | |
| | $d_{15} = 0.1446$ | $n_9 = 1.67357$ | $\nu_9 = 35.70$ |
| $r_{16} = -2.0211$ | | | |
| | $d_{16} = 0.0330$ | | |
| $r_{17} = -2.4178$ | | | |
| | $d_{17} = 0.0715$ | $n_{10} = 1.54930$ | $\nu_{10} = 50.84$ |
| $r_{18} = 0.4300$ | | | |
| | $d_{18} = 0.1572$ | $n_{11} = 1.66596$ | $\nu_{11} = 60.25$ |

-continued

| | | | |
|---|---|---|---|
| $r_{19} = -0.8009$ | | | |
| $d_{19} = 0.0278$ | | | |
| $r_{20} = 0.4379$ | | | |
| $d_{20} = 0.2079$ | $n_{12} = 1.50405$ | $\nu_{12} = 70.15$ | |
| $r_{21} = 0.8048$ | | | |

Embodiment 2

| $f = 1.0$ | | $\beta = 1/10$ | N.A = 0.30 |
|---|---|---|---|
| $r_1 = -1.7856$ | | | |
| $d_1 = 0.2148$ | $n_1 = 1.64089$ | $\nu_1 = 42.32$ | |
| $r_2 = 1.2886$ | | | |
| $d_2 = 0.3436$ | $n_2 = 1.64083$ | $\nu_2 = 56.36$ | |
| $r_3 = -38.9024$ | | | |
| $d_3 = 1.3916$ | | | |
| $r_4 = 41.5498$ | | | |
| $d_4 = 0.2792$ | $n_3 = 1.64083$ | $\nu_3 = 56.36$ | |
| $r_5 = -3.4487$ | | | |
| $d_5 = 0.0086$ | | | |
| $r_6 = 2.5150$ | | | |
| $d_6 = 0.3651$ | $n_4 = 1.64083$ | $\nu_4 = 56.36$ | |
| $r_7 = -11.3553$ | | | |
| $d_7 = 0.0041$ | | | |
| $r_8 = 1.4984$ | | | |
| $d_8 = 0.2645$ | $n_5 = 1.64083$ | $\nu_5 = 56.36$ | |
| $r_9 = 2.7450$ | | | |
| $d_9 = 0.0041$ | | | |
| $r_{10} = 1.0711$ | | | |
| $d_{10} = 0.2350$ | $n_6 = 1.64083$ | $\nu_6 = 56.36$ | |
| $r_{11} = 1.3387$ | | | |
| $d_{11} = 0.0041$ | | | |
| $r_{12} = 0.8123$ | | | |
| $d_{12} = 0.3942$ | $n_7 = 1.58016$ | $\nu_7 = 58.62$ | |
| $r_{13} = -3.4653$ | | | |
| $d_{13} = 0.0828$ | $n_8 = 1.67357$ | $\nu_8 = 35.70$ | |
| $r_{14} = 0.3485$ | | | |
| $d_{14} = 0.2898$ | | | |
| $r_{15} = -1.1694$ | | | |
| $d_{15} = 0.1469$ | $n_9 = 1.67357$ | $\nu_9 = 35.70$ | |
| $r_{16} = -2.0685$ | | | |
| $d_{16} = 0.0335$ | | | |
| $r_{17} = -1.9939$ | | | |
| $d_{17} = 0.0726$ | $n_{10} = 1.54930$ | $\nu_{10} = 50.84$ | |
| $r_{18} = 0.4560$ | | | |
| $d_{18} = 0.1597$ | $n_{11} = 1.66596$ | $\nu_{11} = 60.25$ | |
| $r_{19} = -0.8228$ | | | |
| $d_{19} = 0.0282$ | | | |
| $r_{20} = 0.4608$ | | | |
| $d_{20} = 0.2804$ | $n_{12} = 1.50405$ | $\nu_{12} = 70.15$ | |
| $r_{21} = 0.6119$ | | | | wherein the reference symbols $r_1$ through $r_{21}$ represent radii of curvature on the surfaces of the respective lens elements, the reference symbols $d_1$ through $d_{20}$ designate thicknesses of the respective lens elements and the airspaces therebetween, the reference symbols $n_1$ through $n_{12}$ denote refractive indices of the respective lens elements for the line at a wavelength of 3650 Å, the reference symbols $\nu_1$ through $\nu_{12}$ represent Abbe's numbers of the respective lens elements for the d line.

Figure 2:
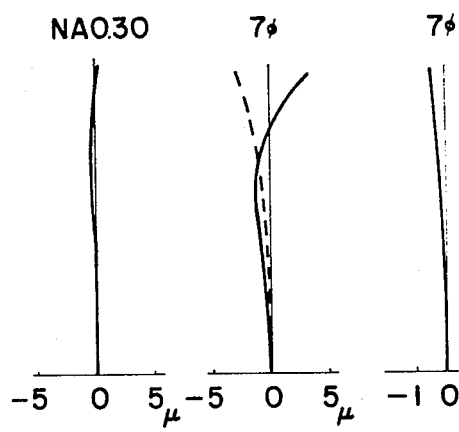
FIG. 2 shows curves illustrating the aberration characteristics of the Embodiment 1.
Figure 2:
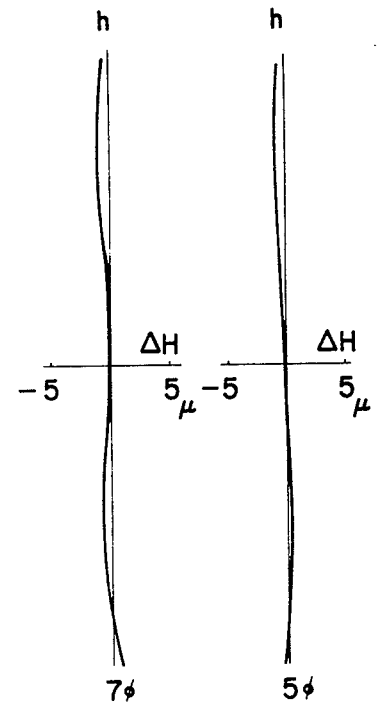
Figure 3:
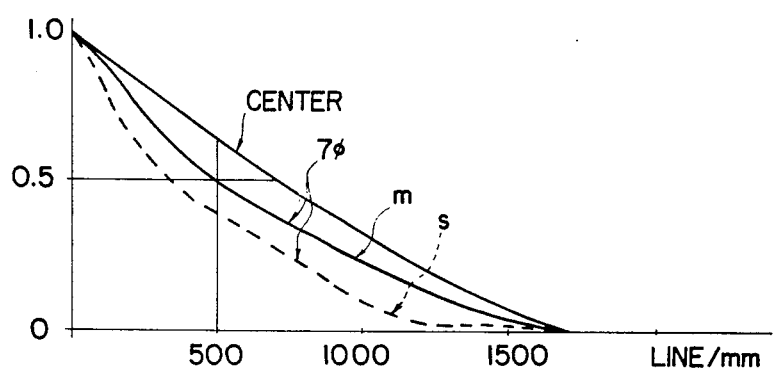
FIG. 3 shows graphs illustrating the OTF characteristics of the Embodiment 1.
Figure 4:
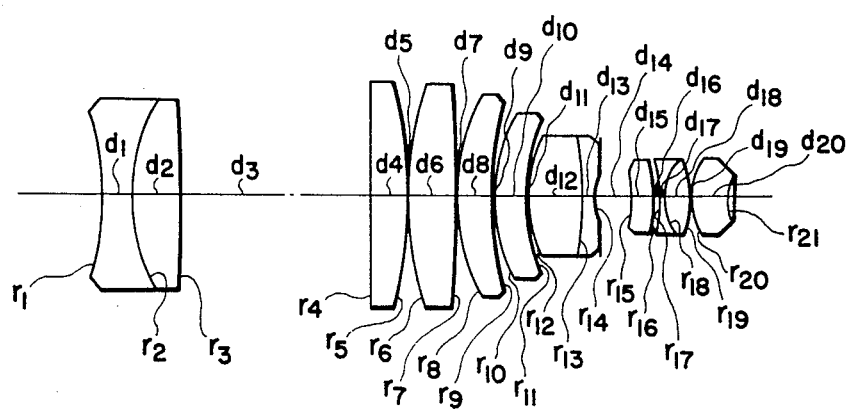
FIG. 4 illustrates a sectional view showing the composition of the Embodiment 2.
Figure 5:
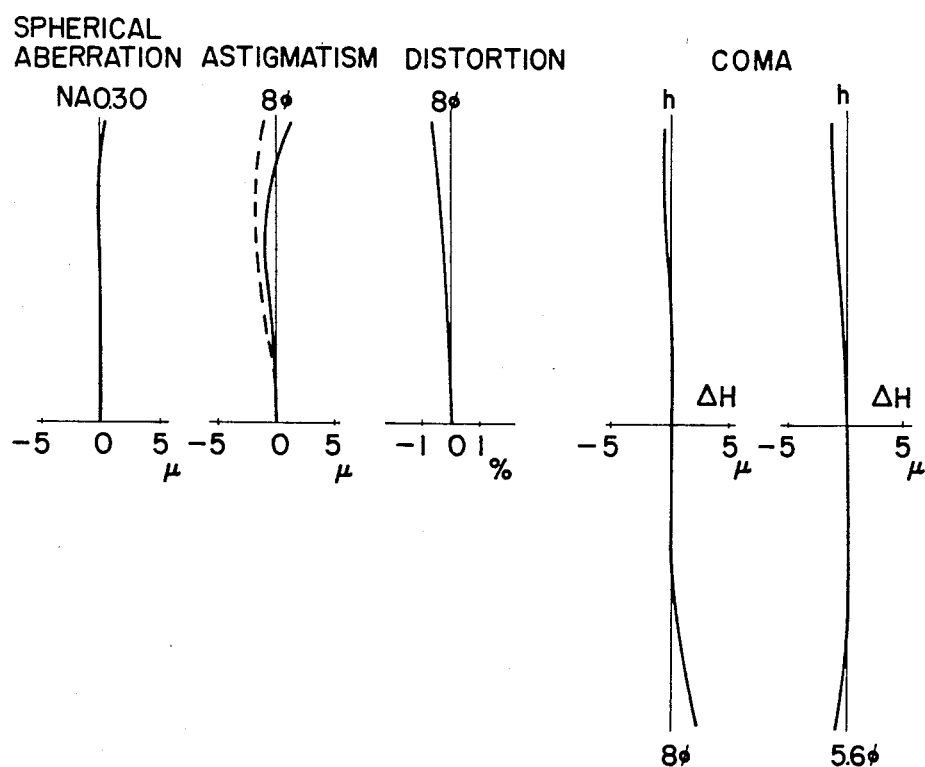
FIG. 5 illustrates graphs showing the aberration characteristics of the Embodiment 2.
Figure 6:
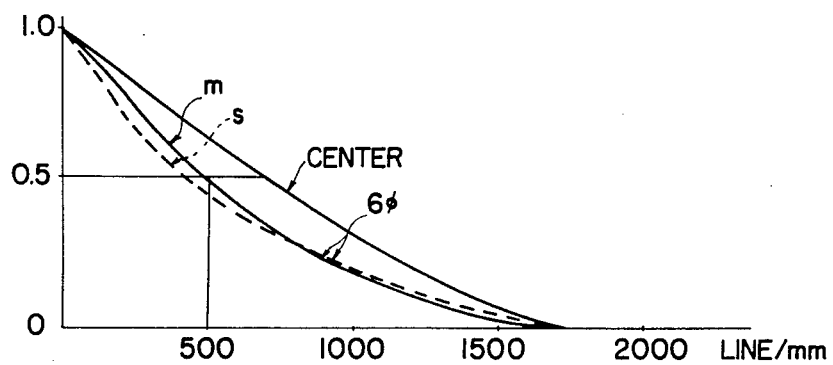
FIG. 6 illustrates curves showing the OTF characteristics of the Embodiment 2.

Of the embodiments described above, the Embodiment 1 has such a composition as shown in FIG. 1 wherein the cemented surface $r_2$ of the first lens component is concave on the object side and the cemented surface of the sixth lens component is concave on the image side. The aberration characteristics and OTF characteristics at a wavelength of 3650 Å of this embodiment are illustrated in FIG. 2 and FIG. 3 respectively. The Embodiment 2 has such a composition as shown in FIG. 2 wherein the cemented surface $r_2$ of the first lens component is concave on the image side and the cemented surface $r_{13}$ of the sixth lens component is concave on the object side. The aberration characteristics and the OTF characteristics of this embodiment are illustrated also for the line at wavelength of 3650 Å in FIG. 5 and FIG. 6 respectively. Seidel's coefficients of these embodiments are as listed below:

Embodiment 1

| | $A_\nu$ | $B_\nu$ | $\Gamma_\nu$ | $P_\nu$ | $Q_\nu$ |
|---|---|---|---|---|---|
| 1 | −0.0081 | 0.0423 | −0.2199 | −0.2102 | 2.2346 |
| 2 | 0.0003 | −0.0022 | 0.0158 | −0.0285 | 0.0922 |
| 3 | −0.1397 | 0.0232 | −0.0039 | −0.0571 | 0.0102 |
| 4 | 0.1670 | 0.0262 | 0.0041 | 0.0120 | 0.0025 |
| 5 | 0.0314 | −0.0667 | 0.1415 | 0.1387 | −0.5945 |
| 6 | 0.2370 | −0.0338 | 0.0048 | 0.1613 | −0.0237 |
| 7 | 0.1407 | −0.2769 | 0.5448 | 0.0305 | −0.1322 |
| 8 | 0.0757 | −0.0109 | 0.0016 | 0.3291 | −0.0478 |
| 9 | 0.0515 | −0.1631 | 0.5165 | −0.1675 | −1.1051 |
| 10 | −0.1287 | −0.0320 | −0.0080 | 0.4484 | 0.1096 |
| 11 | 0.0099 | −0.0732 | 0.5390 | −0.3738 | −1.2169 |
| 12 | −0.0573 | −0.0970 | −0.1641 | 0.5143 | 0.5926 |
| 13 | −0.2417 | 0.2798 | −0.3239 | 0.0076 | 0.3661 |
| 14 | 0.0188 | 0.0188 | 0.0188 | −1.3477 | −1.3308 |
| 15 | −0.3403 | 0.3701 | −0.4025 | −0.5147 | 0.9976 |
| 16 | 0.0783 | −0.1760 | 0.3959 | 0.2113 | −1.3659 |
| 17 | −0.0598 | 0.1429 | −0.3417 | −0.1556 | 1.1888 |
| 18 | −0.0001 | −0.0011 | −0.0113 | 0.1116 | 1.0019 |
| 19 | 0.1502 | 0.0120 | 0.0010 | 0.5297 | 0.0425 |
| 20 | −0.0070 | 0.0756 | −0.8177 | 0.8122 | 0.0595 |
| 21 | 0.0280 | −0.0573 | 0.1173 | −0.4419 | 0.6644 |
| Σ | 0.0060 | 0.0006 | 0.0084 | 0.0098 | 0.5457 |

Embodiment 2

| | $A_\nu$ | $B_\nu$ | $\Gamma_\nu$ | $P_\nu$ | $Q_\nu$ |
|---|---|---|---|---|---|
| 1 | −0.0069 | 0.0375 | −0.2045 | −0.2376 | 2.4132 |
| 2 | −0.0001 | 0.0001 | −0.0001 | −0.0000 | 0.0002 |
| 3 | −0.0321 | −0.0298 | −0.0277 | 0.0109 | −0.0156 |
| 4 | 0.0724 | 0.0429 | 0.0254 | 0.0102 | 0.0211 |
| 5 | 0.0174 | −0.0440 | 0.1116 | 0.1230 | −0.5949 |
| 6 | 0.1579 | 0.0013 | 0.0000 | 0.1687 | 0.0014 |
| 7 | 0.1467 | −0.2960 | 0.5973 | 0.0374 | −1.2807 |
| 8 | −0.0140 | −0.0047 | −0.0016 | 0.2832 | 0.0944 |
| 9 | 0.0366 | −0.1299 | 0.4615 | −0.1546 | −1.0899 |
| 10 | −0.0607 | −0.0497 | −0.0408 | 0.3961 | 0.2912 |
| 11 | 0.0191 | −0.1031 | 0.5563 | −0.3169 | −1.2919 |
| 12 | −0.0406 | −0.0831 | −0.1700 | 0.4910 | 0.6566 |
| 13 | −0.2637 | 0.2661 | −0.2685 | −0.0111 | 0.2822 |
| 14 | 0.0304 | 0.0543 | 0.0969 | −1.2546 | −2.0676 |
| 15 | −0.2069 | 0.3046 | −0.4483 | −0.3739 | 1.2103 |
| 16 | 0.0803 | −0.1739 | 0.3768 | 0.2114 | −1.2746 |
| 17 | −0.0677 | 0.1434 | −0.3039 | −0.1932 | 1.0535 |
| 18 | −0.0002 | −0.0020 | −0.0235 | 0.1077 | 0.9671 |
| 19 | 0.1371 | 0.0141 | 0.0014 | 0.5278 | 0.0542 |
| 20 | −0.0075 | 0.0769 | −0.7871 | 0.7900 | −0.0303 |
| 21 | 0.0087 | −0.0234 | 0.0631 | −0.5950 | 1.4326 |
| Σ | 0.0062 | 0.0012 | 0.0144 | 0.0012 | 0.8323 |

I claim:

1. A lens system for micro film comprising a first negative cemented doublet lens component, a second positive lens component, a third positive lens component, a fourth positive lens component, a fifth positive lens component, a sixth negative cemented doublet lens component, a seventh negative meniscus lens component, an eighth cemented doublet meniscus lens component and a ninth positive meniscus lens component, and said lens system satisfying the following conditions:

(1) $-14f < r_7 < -11f$
(2) $0.31f < r_{14} < 0.35f$
(3) $-1.2f < r_{15} < -0.8f$
(4) $-2.1f < r_{16} < -2.0f$ wherein the reference symbols $r_7$, $r_{14}$, $r_{15}$ and $r_{16}$ represent radii of curvature on the image side surface of the third lens component, the image side surface of the sixth lens component, the object side surface and the image side surface of the seventh lens component, and the reference symbol f designates focal length of the entire lens system as a whole.

2. A lens system for micro film according to claim 1 having the following numerical data:

| f = 1.0 | | β = 1/10 | N.A = 0.30 |
|---|---|---|---|
| $r_1 = -1.6918$ | | | |
| | $d_1 = 0.3359$ | $n_1 = 1.50405$ | $\nu_1 = 70.15$ |
| $r_2 = -2.5058$ | | | |
| | $d_2 = 0.1679$ | $n_2 = 1.67357$ | $\nu_2 = 35.70$ |
| $r_3 = 7.4793$ | | | |
| | $d_3 = 1.3684$ | | |
| $r_4 = 34.4297$ | | | |
| | $d_4 = 0.2749$ | $n_3 = 1.64083$ | $\nu_3 = 56.36$ |
| $r_5 = -2.9883$ | | | |
| | $d_5 = 0.0084$ | | |
| $r_6 = 2.5689$ | | | |
| | $d_6 = 0.3594$ | $n_4 = 1.64083$ | $\nu_4 = 56.36$ |
| $r_7 = -13.5736$ | | | |
| | $d_7 = 0.0041$ | | |
| $r_8 = 1.2594$ | | | |
| | $d_8 = 0.2603$ | $n_5 = 1.64083$ | $\nu_5 = 56.36$ |
| $r_9 = 2.4748$ | | | |
| | $d_9 = 0.0041$ | | |
| $r_{10} = 0.9243$ | | | |
| | $d_{10} = 0.2314$ | $n_6 = 1.64083$ | $\nu_6 = 56.36$ |
| $r_{11} = 1.1089$ | | | |
| | $d_{11} = 0.0041$ | | |
| $r_{12} = 0.7576$ | | | |
| | $d_{12} = 0.2939$ | $n_7 = 1.58016$ | $\nu_7 = 58.62$ |
| $r_{13} = 4.9475$ | | | |
| | $d_{13} = 0.1259$ | $n_8 = 1.67357$ | $\nu_8 = 35.70$ |
| $r_{14} = 0.3169$ | | | |
| | $d_{14} = 0.3421$ | | |
| $r_{15} = -0.8299$ | | | |
| | $d_{15} = 0.1446$ | $n_9 = 1.67357$ | $\nu_9 = 35.70$ |
| $r_{16} = -2.0211$ | | | |
| | $d_{16} = 0.0330$ | | |
| $r_{17} = -2.4178$ | | | |
| | $d_{17} = 0.0715$ | $n_{10} = 1.54930$ | $\nu_{10} = 50.84$ |
| $r_{18} = 0.4300$ | | | |
| | $d_{18} = 0.1572$ | $n_{11} = 1.66596$ | $\nu_{11} = 60.25$ |
| $r_{19} = -0.8009$ | | | |
| | $d_{19} = 0.0278$ | | |
| $r_{20} = 0.4379$ | | | |
| | $d_{20} = 0.2079$ | $n_{12} = 1.50405$ | $\nu_{12} = 70.15$ |
| $r_{21} = 0.8048$ | | | | wherein the reference symbol f represents focal length of the entire lens system as a whole, the reference symbols $r_1$ through $r_{21}$ designate radii of curvature on the surfaces of the respective lens elements, the reference symbols $d_1$ through $d_{20}$ denote thicknesses of the respective lens elements and the airspaces therebetween, the reference symbols $n_1$ through $n_{12}$ represent refractive indices of the respective lens element for a line at a wavelength of 3650 Å and the reference symbols $\nu_1$ through $\nu_{12}$ represent Abbe's numbers of the respective lens elements for the d line.

3. A lens system for micro film according to claim 1 having the following numerical data:

| f = 1.0 | | β = 1/10 | N.A = 0.30 |
|---|---|---|---|
| $r_1 = -1.7856$ | | | |
| | $d_1 = 0.2148$ | $n_1 = 1.64089$ | $\nu_1 = 42.32$ |
| $r_2 = 1.2886$ | | | |
| | $d_2 = 0.3436$ | $n_2 = 1.64083$ | $\nu_2 = 56.36$ |
| $r_3 = -38.9024$ | | | |
| | $d_3 = 1.3916$ | | |
| $r_4 = 41.5498$ | | | |
| | $d_4 = 0.2792$ | $n_3 = 1.64083$ | $\nu_3 = 56.36$ |
| $r_5 = -3.4487$ | | | |
| | $d_5 = 0.0086$ | | |
| $r_6 = 2.5150$ | | | |
| | $d_6 = 0.3651$ | $n_4 = 1.64083$ | $\nu_4 = 56.36$ |
| $r_7 = -11.3553$ | | | |
| | $d_7 = 0.0041$ | | |
| $r_8 = 1.4984$ | | | |
| | $d_8 = 0.2645$ | $n_5 = 1.64083$ | $\nu_5 = 56.36$ |
| $r_9 = 2.7450$ | | | |
| | $d_9 = 0.0041$ | | |
| $r_{10} = 1.0711$ | | | |
| | $d_{10} = 0.2350$ | $n_6 = 1.64083$ | $\nu_6 = 56.36$ |
| $r_{11} = 1.3387$ | | | |
| | $d_{11} = 0.0041$ | | |
| $r_{12} = 0.8123$ | | | |
| | $d_{12} = 0.3942$ | $n_7 = 1.58016$ | $\nu_7 = 58.62$ |
| $r_{13} = -3.4653$ | | | |
| | $d_{13} = 0.0828$ | $n_8 = 1.67357$ | $\nu_8 = 35.70$ |
| $r_{14} = 0.3485$ | | | |
| | $d_{14} = 0.2898$ | | |
| $r_{15} = -1.1694$ | | | |
| | $d_{15} = 0.1469$ | $n_9 = 1.67357$ | $\nu_9 = 35.70$ |
| $r_{16} = -2.0685$ | | | |
| | $d_{16} = 0.0335$ | | |
| $r_{17} = -1.9939$ | | | |
| | $d_{17} = 0.0726$ | $n_{10} = 1.54930$ | $\nu_{10} = 50.84$ |
| $r_{18} = 0.4560$ | | | |
| | $d_{18} = 0.1597$ | $n_{11} = 1.66596$ | $\nu_{11} = 60.25$ |
| $r_{19} = -0.8228$ | | | |
| | $d_{19} = 0.0282$ | | |
| $r_{20} = 0.4608$ | | | |
| | $d_{20} = 0.2804$ | $n_{12} = 1.50405$ | $\nu_{12} = 70.15$ |
| $r_{21} = 0.6119$ | | | | wherein the reference symbol f represents focal length of the entire lens system as a whole, the reference symbols $r_1$ through $r_{21}$ designate radii of curvature on the surfaces of the respective lens elements, the reference symbols $d_1$ through $d_{20}$ denote thicknesses of the respective lens elements and the airspaces therebetween, the reference symbols $n_1$ through $n_{12}$ represent refractive indices of the respective lens element for a line at a wavelength of 3650 Å and the reference symbols $\nu_1$ through $\nu_{12}$ represent Abbe's numbers of the respective lens elements for the d line.

* * * * *